US00RE38208E

(19) United States
(12) Reissued Patent
Terk

(10) Patent Number: US RE38,208 E
(45) Date of Reissued Patent: Aug. 5, 2003

(54) SYSTEM FOR EXTENDING INFRARED REMOTE CONTROL

(75) Inventor: Neil D. Terk, 1 Vista Dr., Laurel Hollow, NY (US) 11791

(73) Assignee: Neil D. Terk, Laurel Hollow, NY (US)

(21) Appl. No.: 09/640,343

(22) Filed: Aug. 16, 2000

Related U.S. Patent Documents

Reissue of:
(64) Patent No.: 5,815,108
Issued: Sep. 29, 1998
Appl. No.: 08/768,673
Filed: Dec. 18, 1996

(51) Int. Cl.[7] ..... H04B 9/00
(52) U.S. Cl. ..... 341/176; 341/173; 455/42
(58) Field of Search ..... 341/176, 173; 455/42; 359/145, 146, 147; 381/3; 7/14; 348/734, 729

(56) References Cited

U.S. PATENT DOCUMENTS

| | | | | |
|---|---|---|---|---|
| 3,590,382 A | 6/1971 | Kenney | 381/3 |
| 4,509,211 A | 4/1985 | Robbins | 359/145 |
| 4,709,412 A | 11/1987 | Seymour et al. | 359/145 |
| 4,809,359 A | 2/1989 | Dockery | 359/145 |
| 4,847,903 A | 7/1989 | Schotz | 381/3 |
| 5,010,399 A | 4/1991 | Goodman et al. | 348/14 |
| 5,142,397 A | 8/1992 | Dockery | 341/176 |
| 5,272,525 A | 12/1993 | Borchardt et al. | 348/729 |
| 5,299,264 A | 3/1994 | Schotz et al. | 381/14 |
| 5,410,735 A | 4/1995 | Borchardt et al. | 455/42 |

*Primary Examiner*—Michael Horabik
*Assistant Examiner*—Albert K. Wong
(74) *Attorney, Agent, or Firm*—Gerald T. Bodner

(57) ABSTRACT

An assembly or system for effecting control of an electronic device having an infrared sensor for receiving an infrared control signal from a manually actuated remote control comprises, in accordance with the present invention, an infrared sensor for receiving and converting the infrared control signal from the remote control to an electrical signal, the sensor being attached to an audio speaker assembly of an audio reproduction system. A signal generator also attached to the speaker assembly is operatively connected to the sensor for generating an RF carrier signal modulated by control information encoded in the infrared control signal and the electrical signal. A transmission link is provided for transmitting the modulated RF carrier signal from the speaker assembly to the electronic device. A signal receiver disposed adjacent to the infrared sensor of the electronic device receives the modulated RF carrier signal and converts the modulated RF carrier signal to a secondary infrared signal essentially identical to the infrared control signal.

33 Claims, 2 Drawing Sheets

FIG. 1 (AMENDED)
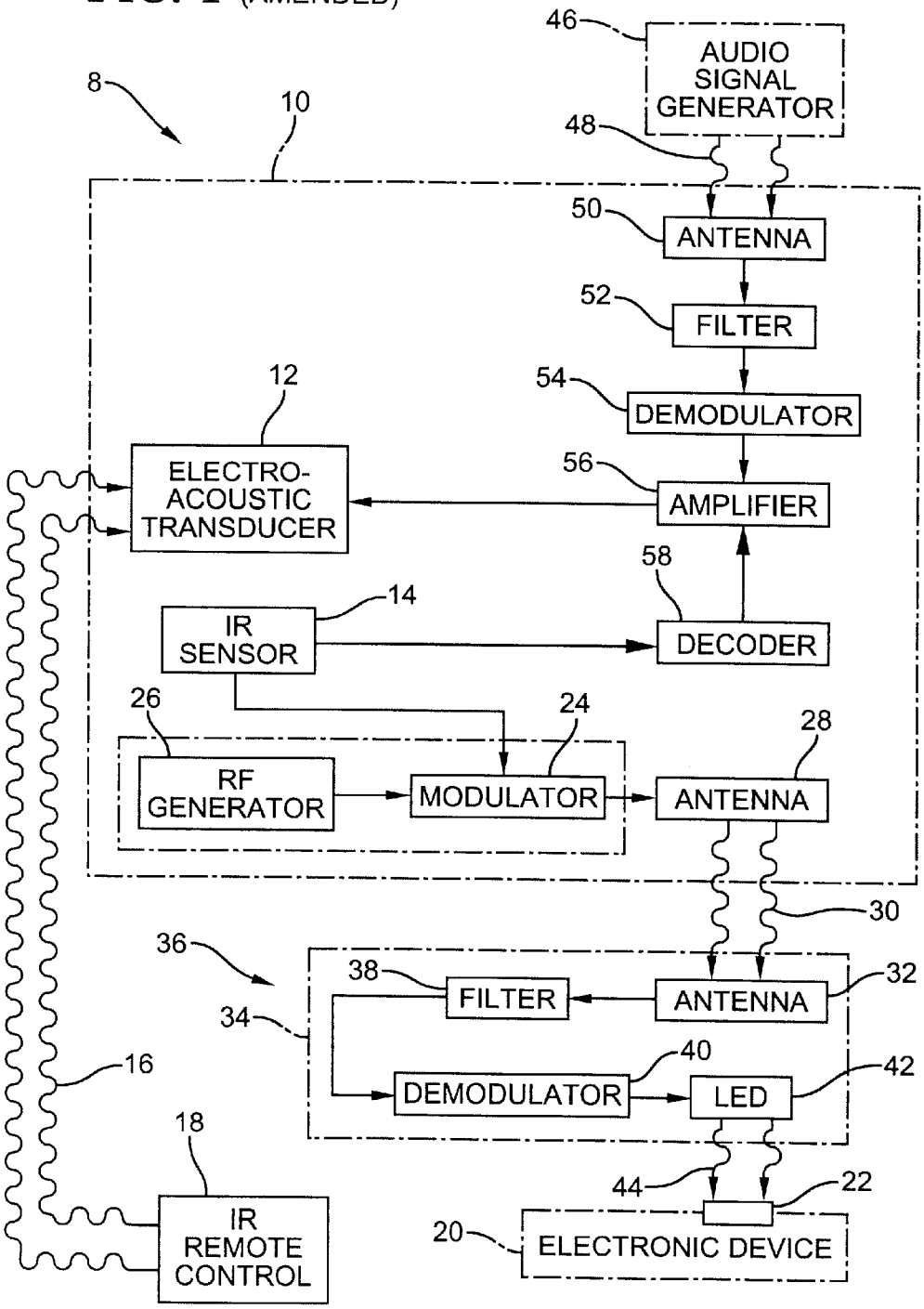

FIG. 2 (AMENDED)
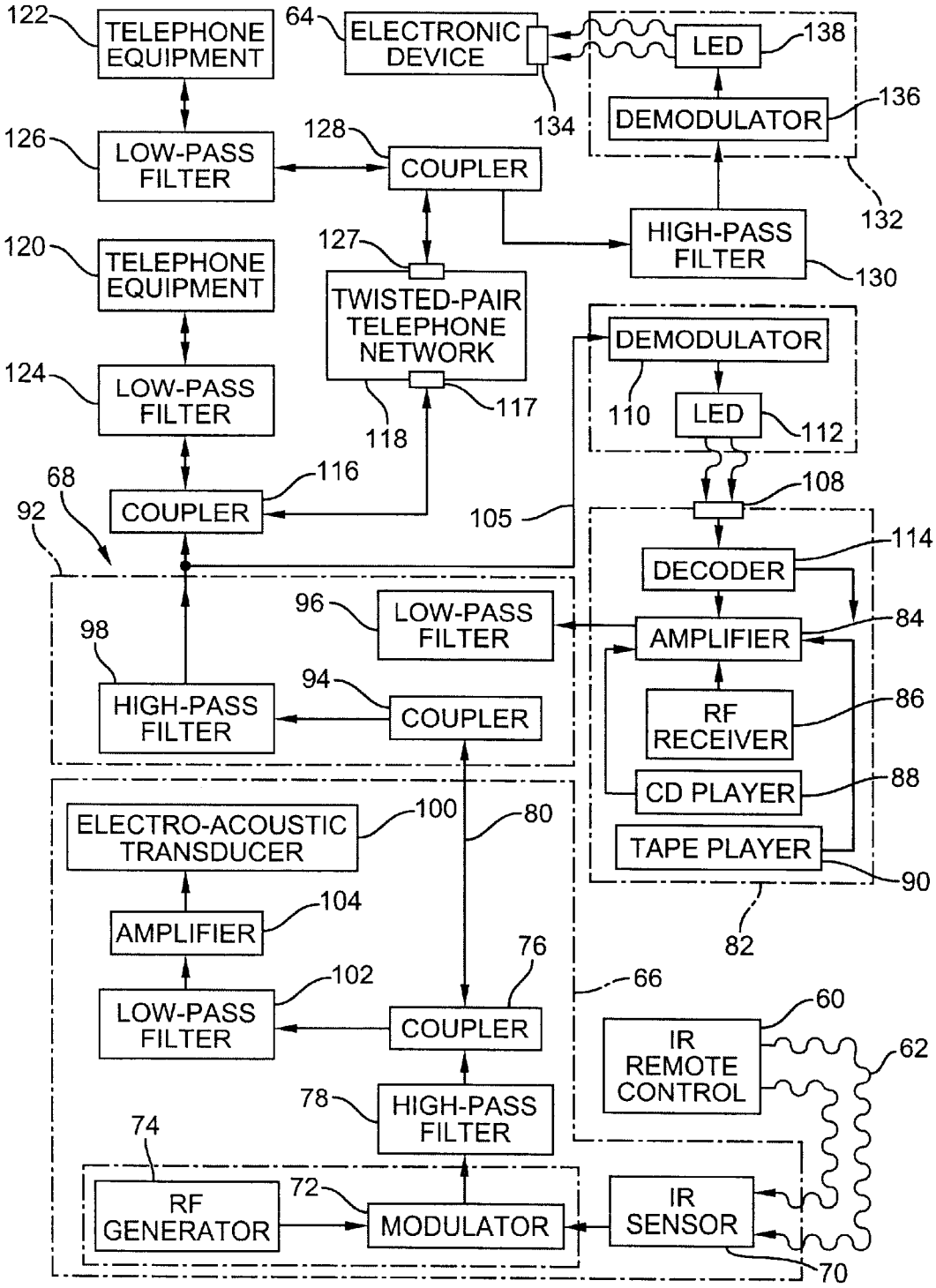

SYSTEM FOR EXTENDING INFRARED REMOTE CONTROL

Matter enclosed in heavy brackets [ ] appears in the original patent but forms no part of this reissue specification; matter printed in italics indicates the additions made by reissue.

BACKGROUND OF THE INVENTION

This invention relates to a system which utilizes an infrared remote control unit to control an electronic device. This invention more particularly relates to a system in which the range of the infrared remote control device is extended.

Electrical systems which employ an infrared remote control unit necessarily require that an unobstructed linear path exists between the remote control and the electronic device being controlled. Accordingly, infrared remote control units are unable to control electronic devices which are disposed around a corner or on a floor different from the location of the remote control. Of course, many situations arise where it is desirable to control a VCR, a television, a satellite dish receiver, a video cable box, a sound reproduction system or other electronic device from a location shielded from the electronic device.

One solution to the problem of remotely controlling an electronic device from a location which has no line of sight path to the electronic device is described in U.S. Pat. No. 4,509,211 to Robbins. That patent is directed to the transmission of video and control signals over a coaxial television cable. Infrared control signals are received by a sensor and converted to equivalent electrical signal form, the electrical control signal being transmitted over the coaxial cable to a repeater unit in the form of an infrared emitter. Robbins also suggests transmitting the control signals over power lines or telephone lines. The transmission of control signals over the internal twisted pair telephone wiring network of a residence or other building is disclosed in detail in U.S. Pat. No. 5,010,399 to Goodman et al.

Another solution to the problem of remotely controlling an electronic device from a location which has no line of sight path to the electronic device is described in U.S. Pat. No. 4,809,359 to Dockery. In accordance with that patent, an infrared remote control signal is converted to an RF signal which is transmitted wirelessly through essentially any obstruction to an infrared sensor on the electronic device being controlled. A particular implementation of this solution is disclosed in the prior U.S. Pat. No. 4,709,412 to Seymour et al. Pursuant to that implementation, an infrared sensor is placed in close proximity to the infrared emitter of the remote control unit. The corresponding RF signal is wirelessly emitted by an antenna also disposed in close proximity to the remote control unit. This kind of implementation has been commercialized in the LEAPFROG™ design distributed in recent years by Terk Technologies Corporation now of Commack, N.Y.

A problem with the latter kind of RF extenders of infrared remote control units is that the remote control itself is encumbered by an add-on device. In the event that the IR-to-RF add-on blocks transmission of the IR signal, then the add-on must be removed from the IR remote control. Then the add-on device is prone to misplacement. Where an IR-to-RF extender is constructed as a separate stand-alone unit, it has the disadvantage of adding additional clutter to an entertainment space.

Another disadvantage of the attached kind of IR-to-RF converter is that each infrared control must have its own converter. This multiplication of extenders is burdensome and multiplies the shortcomings of a single IR-to-RF converter.

OBJECTS OF THE INVENTION

An object of the present invention is to provide an improved infrared remote control extender system and/or an associated method for extending the operational range of an infrared remote control unit.

Another object of the present invention is to provide an infrared remote control extension system which is separate from the remote control and accordingly does not impede the emission of the IR signal to local devices.

An additional object of the present invention is to provide an infrared remote control extension system which requires but a single IR-to-RF converter, even if multiple infrared remote controls are used in the same space.

Yet another object of the present invention is to provide an infrared remote control extension system which can avoid the addition of another electronic object to the visible space in a room.

These and other objects of the present invention will be apparent from the descriptions and drawings herein.

BRIEF DESCRIPTION

An assembly or system for effecting control of an electronic device having an infrared sensor for receiving an infrared control signal from a manually actuated remote control comprises, in accordance with the present invention, a speaker assembly which contains an electro-acoustic transducer (speaker) and an infrared sensor. The speaker is operatively linked to an audio reproduction system, while the sensor receives and converts the infrared control signal from the remote control to an electrical signal. A signal generator, preferably mounted to the speaker assembly, is operatively connected to the IR sensor for generating an RF carrier signal modulated by control information encoded in the infrared control signal and the electrical signal. A transmission link is provided for transmitting the modulated RF carrier signal from the speaker assembly to the electronic device. A signal receiver disposed adjacent to the infrared sensor of the electronic device receives the modulated RF carrier signal and converts the modulated RF carrier signal to a secondary infrared signal essentially identical to the infrared control signal.

In one embodiment of the invention, the transmission link includes a wire or cable extending from the speaker assembly to an amplification unit of the audio reproduction system. The signal generator is electrically connected to the wire or cable so that the modulated RF carrier signal is transmitted in one direction over the wire or cable, while an electrical audio signal is transmitted in an opposite direction over the wire or cable, from the amplification unit to the speaker housing.

In accordance with a more specific embodiment of the invention, the transmission link further includes a first connector for conducting the modulated RF carrier signal from the wire or cable to a socket at a first location of a wiring network internal to a building. The wiring network may be a twisted-pair telephone network, electrical power transmission lines or coaxial cables. The modulated RF carrier signal is conducted over the wiring network from the first location to a second location where a second connector of the transmission link is provided for conducting the modulated RF carrier signal from the wiring network to the signal receiver. The transmission link may additionally include a low-pass filter for blocking the modulated RF carrier signal from entering the amplification unit and a high-pass filter for blocking an audio signal from the amplification unit from being transmitted over the wiring network via the first connector.

Instead of the wiring network, a dedicated electrical line may extend from the speaker wire or cable to the signal receiver. In that case, the modulated RF carrier signal is transmitted over the wire or cable and the electrical line to the signal receiver.

In another, alternative embodiment of the present invention, the transmission link includes an antenna operatively connected to the signal generator and possibly mounted to the speaker assembly for wirelessly transmitting the modulated RF carrier signal from the signal generator to the signal receiver. Where the speaker housing contains a wireless audio signal receiver operatively connected to the speaker, a component may be provided for modifying a characteristic (e.g., amplitude) of an audio signal applied to the speaker, the IR sensor being operatively connected to the modification component for changing the characteristic in accordance with instructions encoded in the infrared control is signal.

The present invention is also directed to a method for effecting control of an electronic device having an infrared sensor for receiving an infrared control signal from a manually actuated remote control. The method comprises (I) operating the remote control to produce the infrared signal, (ii) receiving the infrared signal at an audio speaker assembly of an audio reproduction system, (iii) generating an RF carrier frequency at the speaker assembly, (iv) modulating the RF carrier frequency, also at the speaker assembly, with instructions encoded in the received infrared control signal, (v) transmitting the modulated RF carrier frequency from the speaker assembly to the electronic device, (vi) receiving the modulated RF carrier frequency at the electronic device, (vii) generating, at the electronic device in response to the received modulated RF carrier frequency, a secondary infrared signal substantially similar to the infrared control signal, and (viii) emitting the secondary infrared signal toward the infrared sensor of the electronic device.

In accordance with a feature of the present invention, the transmitting of the modulated RF carrier frequency includes transmitting the modulated RF carrier frequency over a speaker wire or cable extending from the speaker assembly to an amplification unit of the audio reproduction system. Thus, the speaker wire or cable simultaneously carries, in opposite directions, the remote control instructions in the modulated RF carrier wave and an electrical audio signal.

In accordance with another feature of the present invention, the transmission path of the modulated RF carrier frequency includes a wiring (telephone, power, cable) network internal to building structure. The modulated RF carrier frequency is conducted from the wire or cable to a socket of the wiring network, at a first location internal *to the building structure*, transmitted over the wiring network and conducted from the wiring network at a second location to the signal receiver.

The method may include selectively filtering the modulated RF carrier frequency so that it does not enter the amplification unit. Also, the audio signal from the amplification unit may be blocked [by filtering] from being transmitted over the wiring network via the first connector *by filtering*.

Pursuant to the alternative embodiment of the invention, the transmitting of the modulated RF carrier frequency includes wirelessly emitting the modulated RF carrier frequency from an antenna operatively connected to the signal generator and mounted to a speaker assembly structure (e.g., a baffle). In that case, the method may further comprise receiving a wireless audio signal in the speaker housing, converting the wireless audio signal to an electrical signal, applying the electrical audio signal to the speaker to generate an acoustic pressure wave, *and* modifying, in accordance with instructions encoded in the infrared control signal a characteristic (e.g., amplitude) of the electrical audio signal applied to the speaker.

An infrared remote control extender system in accordance with the present invention is intended to be separate or spaced from the remote control and accordingly does not impede the emission of the IR signal to local devices. Moreover, an infrared remote control extension system in accordance with the present invention requires only one IR-to-RF converter which accommodates multiple infrared remote controls in the same space.

In an infrared remote control extension system in accordance with the present invention, the infrared sensor and RF generator are placed within a speaker, a normal and unavoidable component of an entertainment system. Thus, the invention avoids the addition of another electronic object to the visible space in a room.

BRIEF DESCRIPTION OF THE DRAWING

FIG. 1 is a block diagram of a system incorporating an infrared extender assembly in accordance with the present invention.

FIG. 2 is a block diagram of another system incorporating an infrared extender assembly in accordance with the present invention.

DESCRIPTION OF THE PREFERRED EMBODIMENTS

As shown in FIG. 1, an audio speaker 8 of a home audio reproduction system includes a speaker housing 10 which contains an electro-acoustic transducer 12 and an infrared sensor 14. Sensor 14 generates an electrical signal in response to an infrared signal 16 emitted by a manually actuated infrared remote control unit 18. Infrared signal 16 is designed to control the operation of an electronic device 20 such as a satellite dish control box, a cable control box, a VCR, a video camera, etc. It is to be understood that electronic device 20 may include some mechanical components, for example, where the electronic device is a CD player or changer. IR signal 16 cannot be used directly to control electronic device 20 because there is no line-of-sight path between remote control unit 18 and an IR sensor 22 on electronic device 20. Electronic device 20 is, for example, located in a different room from remote control unit 18.

The electrical signal produced by sensor 14 encodes instructions which are contained in the infrared signal 16 from remote control 18. The electrical signal is applied to a modulator 24 which uses the electrical signal to modulate a radio-frequency (RF) carrier signal from an RF generator 26. The modulated RF electrical carrier signal produced by generator 26 and modulator 24 is applied to an antenna 28 mounted to speaker housing 10. A wireless modulated RF carrier signal 30 having the same frequency and carrying the same information as the modulated RF electrical carrier signal from generator 26 and modulator 24 is transmitted through obstructions such as walls and floors (not shown) to a remote antenna 32 generally located in the same building as speaker housing 10 and remote control unit 18. Antenna 32 is mounted to a casing 34 of a converter device 36 which also includes a filter 38, a demodulator 40 and an LED emitter 42. The wireless modulated RF carrier signal 30 is processed by filter 38 and demodulator 40 so that a wireless infrared signal 44 emitted by LED 42 is essentially identical to infrared control signal 16 emitted by infrared remote control unit 18. Converter device 36 is disposed proximately to sensor 22 which receives the reproduced infrared control signal 44 and thereby effectuates control of electronic device 20.

Speaker 8 may be connected by a wire or cable (not shown) to an audio signal generator 46. Alternatively, speaker 8 may be operated wirelessly. In that event, audio generator 46 produces a wireless RF signal 48 which is received by an antenna 50 in or on speaker housing 10. The received signal is processed by a filter 52, a demodulator 54 and an amplifier 56 and applied to electro-acoustic transducer 12. One or more parameters or characteristics of the signal applied to transducer 12 may be modified at speaker 8, e.g., in amplifier 56, in response to an instruction encoded in infrared control signal 16. To that end, IR sensor 14 is connected to a decoder 58 which is connected in turn to amplifier 56. The amplitude of the electrical audio signal from amplifier 56 may be adjusted, for example, to affect stereophonic balance. Amplifier 56 may also be controlled to modify equalization parameters in response to an instruction in remote control signal 16.

FIG. 2 illustrates another system with an assembly for extending the range of an IR remote control unit 60. IR remote control 60 produces a wireless infrared signal 62 which is adapted for controlling the operation of an electronic device 64, as discussed above. To operate electronic device 64 when it is located, for example, in a different room from remote control unit 60, a housing 66 of a speaker 68 contains an IR sensor 70 which detects IR signal 62 and converts it to an electrical signal having the same information content as the IR signal. A modulator 72 modulates an RF electrical carrier frequency from a generator or source 74 in response to the electrical signal from sensor 70 so that the modulated electrical carrier frequency has the same information content as IR remote control signal 62. The modulated RF carrier frequency is transmitted from modulator 72 to a coupler circuit 76 via a high-pass filter 78.

Coupler circuit 76 is connected to a speaker wire or cable 80 which extends toward an audio signal generating system 82 [particularly including] *via a signal separating and connecting device 92. The audio signal generating system 82 includes* an amplifier 84 and one or more audio signal sources including a radio receiver 86, a compact disk (CD) player 88, and a magnetic-tape player 90. [A] *The* signal separating and connecting device 92 is disposed at *the* audio signal generating system 82 for separating control signals from audio signals. Device 92 includes a coupler circuit 94, a low-pass filter 96 and a high-pass filter 98. Coupler circuit 94 is [connected] *connected,* on one [side] *side,* to speaker wire or cable [80] *80,* [and] *and,* on another [side] *side,* to amplifier [82] *84* via low-pass filter 96. Low-pass filter 96 isolates and protects audio signal generating system [82] *82,* and particularly amplifier [84] *84,* from RF control signals which are transmitted over wire or cable 80 from modulator 72. Audio signals from amplifier 84 are transmitted to an electro-acoustic transducer 100 of speaker 68 over a path including low-pass filter 96, coupler [circuit] *circuits,* 94, *76,* wire or cable 80, another low-pass filter 102 and, optionally, an amplifier 104. Although not shown in the drawing, the audio frequency signal applied to transducer 100 by amplifier 104 may have parameters or characteristics modified in accordance with instructions in IR signal 62, as discussed hereinabove with reference to FIG. 1.

The modulated RF electrical carrier signal produced by modulator 72 in response to the RF carrier from generator 74 and the electrical remote control signal from sensor 70 is selectively transmitted via high-pass filter 98 and a dedicated electrical fine 105 to a module 106 disposed at an IR sensor 108 of audio signal generating system 82. Module 106 includes a demodulator 110 which extracts the control information from the modulated RF electrical carrier signal. Module 106 further includes an LED emitter 112 which essentially reproduces control signal 62 and applies the signal to sensor 108 for controlling selected operations of audio signal generating system 82. To that end, audio signal generating system 82 includes a decoder 114 operatively connected to sensor 108 for determining which function of audio signal generating system 82 is to be controlled.

Alternatively or additionally, the modulated RF electrical carrier signal produced by modulator 72 in response to the RF carrier from generator 74 and the electrical remote control signal from sensor 70 is selectively transmitted via high-pass filter 98, a coupling circuit 116, and a conventional telephone jack or socket 117 to a twisted-pair telephone wiring network 118. As disclosed in U.S. Pat. No. 5,010,399 to Goodman et al., the modulated RF electrical carrier signal for remotely controlling electronic device 64 is carried by twisted-pair telephone wiring network 118 simultaneously with ordinary telephone signals generated by conventional telephone devices 120 and 122. Telephone devices 120 and 122 are connected to network 118 via respective low-pass filters 124 and 126 and coupler circuits 116 and 128. The internal telephone wiring network 118 may also be used to carry video and audio signals as disclosed in U.S. Pat. No. 5,010,399, the disclosure of which is hereby incorporated by reference.

The modulated RF electrical carrier signal produced by modulator 72 and carried over twisted-pair telephone wiring network 118 is transmitted therefrom via a telephone jack or socket [128] *127* and coupler circuit 128 to a [high-pass-filter] *high-pass filter* 130. Filter 130 is connected to a module 132 disposed at an IR sensor 134 of electronic device 64. A demodulator component 136 of module 132 extracts the control information from the modulated RF electrical carrier signal. An LED emitter 138 of module 132 essentially reproduces control signal 62 and applies the signal to sensor 134 for controlling selected operations of electronic device 64.

Coupler 128, low-pass filter 126 and high-pass filter 130 may be incorporated into a single casing. Coupler 128 and high-pass filter *130* are part of a transmission link operatively connecting coupler 76 to electronic device 64 for conducting the modulated RF carrier signal from speaker 68 to the electronic device *64*. Low-pass filter 96 is included in the transmission link for blocking the modulated RF carrier signal from entering amplifier 84, while high-pass filter 98 blocks an audio output signal from amplifier *84* from being transmitted over telephone network 118 via separating and connecting device 92.

Although the invention has been described in terms of particular embodiments and applications, one of ordinary skill in the art, in light of this teaching, can generate additional embodiments and modifications without departing from the spirit of or exceeding the scope of the claimed invention. For example, the RF signal carrying the remote control instructions may be relayed from the amplifier end of a speaker wire to another location within a residence by pre-existing internal wiring other than twisted-par telephone wiring. Such pre-existing wiring includes coaxial cable and power lines (see U.S. Pat. No. 4,509,211 to Robbins, incorporated by reference).

It is to be noted that the present invention is directed in part to the provision of infrared sensors 14 and 70 in speaker assemblies 8 and 68 of audio reproduction systems. FIGS. 1 and 2 depict speaker assemblies 8 and 68 as having housings 10 and 66. Housings 10 and 66 may be dedicated speaker casings or may be larger structures having additional functions, such as fixtures or furniture. For instance, housings 10 and 66 may be parts of a building, as where transducers 12 and 100 are mounted inside a wall. In any event, sensors 14 and 70 are located at the speaker assemblies 8 and 68 and are attached, indirectly, to speakers or transducers 12 and 100. Sensors 14 and 70 are generally mounted to a grill (not shown) or a baffle (not shown) to which transducers 12 and 100 are attached. However, sensors 14 and 17 may be attached directly to other structural components of speaker assemblies 8 and 68, such as housings 10 and 66, supports inside a building wall (not shown), etc.

Accordingly, it is to be understood that the drawings and descriptions herein are proffered by way of example to facilitate comprehension of the invention and should not be construed to limit the scope thereof.

What is claimed is:

1. An infrared remote control extension system for effecting control of an electronic device having an infrared sensor for receiving an infrared control signal from a manually actuated remote control, the assembly comprising:

an audio speaker assembly including an electro-acoustic transducer, said transducer being operatively coupled to an audio reproduction system;

an infrared sensor at least indirectly attached to said speaker assembly for receiving and converting the infrared control signal from the remote control to an electrical signal;

a signal generator operatively connected to said sensor for generating an RF carrier signal containing or carrying control information encoded in said infrared control signal and said electrical signal;

transmission means for transmitting the RF carrier signal from said signal generator to the electronic device; and a signal receiver at the electronic device for receiving and converting the RF carrier signal transmitted from said signal generator to a secondary infrared signal essentially identical to said infrared control signal, said signal receiver being disposed adjacent to the infrared sensor of the electronic device.

2. The extension system defined in claim 1 wherein said transmission means includes a wire or cable extending from said transducer to an amplification unit of said audio reproduction system, said wire or cable being electrically connected to said signal generator and to said amplification unit so that said wire or cable carries an electrical audio signal from said amplification unit toward said transducer and carries said RF carrier signal from said signal generator toward said signal receiver.

3. The extension system defined in claim 2 wherein said transmission means further includes a first connector for conducting the RF carrier signal from said wire or cable to a first location of a wiring network internal to a building, said transmission means also including a second connector for conducting the RF carrier signal from a second location of said wiring network to said signal receiver.

4. The extension system defined in claim 3 wherein said transmission means additionally includes a low-pass filter for blocking said RF carrier signal from entering said amplification unit.

5. The extension system defined in claim 4 wherein said transmission means also includes a high-pass filter for blocking said audio signal from said amplification unit from being transmitted over said wiring network via said first connector.

6. The extension system defined in claim 2 wherein said transmission means further includes an electrical line extending from said wire or cable to said signal receiver, said RF carrier signal being transmitted over said wire or cable and said electrical line to said signal receiver.

7. The extension system defined in claim 1 wherein said transmission means includes an antenna operatively connected to said signal generator for wirelessly transmitting said RF carrier signal from said signal generator to said signal receiver.

8. The extension system defined in claim 7 wherein a wireless audio signal receiver is operatively connected to said transducer, further comprising modification means operatively connected to said audio signal receiver and said transducer for modifying a characteristic of an audio signal applied to said transducer from said audio signal receiver, said sensor being operatively connected to said modification means for changing said characteristic in accordance with instructions encoded in said infrared control signal.

9. The extension system defined in claim 8 wherein said characteristic is an amplitude of the audio signal applied to the speaker assembly.

10. The extension system defined in claim 1 wherein said speaker assembly includes a speaker housing, said sensor being mounted to said housing.

11. A method for effecting control of an electronic device having an infrared sensor for receiving an infrared control signal from a manually actuated remote control, the method comprising:

operating the remote control to produce the infrared signal;

receiving said infrared signal at an audio speaker assembly of an audio reproduction system;

at the speaker assembly, generating an RF carrier frequency;

also at the speaker assembly, modulating the RF carrier frequency with instructions encoded in the received infrared control signal;

transmitting the RF carrier frequency from the speaker assembly to the electronic device; and at the electronic device, receiving the RF carrier frequency;

in response to the received RF carrier frequency, generating, at said electronic device, a secondary infrared signal substantially similar to said infrared control signal; and emitting said secondary infrared signal toward the infrared sensor of the electronic device.

12. The method defined in claim 11 wherein the transmitting of the RF carrier frequency includes transmitting the RF carrier frequency over a wire or cable extending from said speaker assembly to an amplification unit of said audio reproduction system.

13. The method defined in claim 12 wherein the transmitting of the RF carrier frequency further includes conducting the RF carrier frequency from said wire or cable to a socket at a first location of a wiring network internal to a building, transmitting the RF carrier frequency over the wiring network, and conducting the RF carrier frequency from a second location of said wiring network to said signal receiver.

14. The method defined in claim 13, further comprising blocking said RF carrier frequency from entering said amplification unit.

15. The method defined in claim 14, further comprising blocking an audio signal from said amplification unit from being transmitted over said wiring network via said first connector.

16. The method defined in claim 13 wherein said wiring network is a twisted-pair telephone wiring network.

17. The method defined in claim 12 wherein the transmitting of the RF carrier frequency further includes transmitting said RF carrier frequency over an electrical line extending from said wire or cable to said signal receiver.

18. The method defined in claim 11 wherein the transmitting of the RF carrier frequency includes wirelessly emitting said RF carrier frequency from an antenna operatively connected to said speaker assembly.

19. The method defined in claim 18, further comprising:

receiving a wireless audio signal at said speaker assembly;

converting said wireless audio signal to an electrical signal;

applying said electrical signal to said speaker to generate an acoustic pressure wave; and modifying, in accordance with instructions encoded in said infrared control signal, a characteristic of said electrical signal applied to said speaker assembly.

20. The method defined in claim 18 wherein said characteristic is a loudness or volume level of a reproduced audio signal.

21. An infrared remote control extension system for effecting control of an electronic device having an infrared sensor for receiving an infrared control signal from a manually actuated remote control, the assembly comprising:

an audio speaker assembly including an electro-acoustic transducer, said transducer being operatively coupled to an audio reproduction system;

an infrared sensor at least indirectly attached to said speaker assembly for receiving and converting the infrared control signal from the remote control to an electrical signal;

a signal generator operatively connected to said sensor for generating an RF carrier signal carrying control information encoded in said infrared control signal and said electrical signal;

transmission means for transmitting the RF carrier signal from said signal generator to the electronic device;

a signal receiver at the electronic device for receiving and converting the RF carrier signal transmitted from said signal generator to a secondary infrared signal essentially identical to said infrared control signal, said signal receiver being disposed adjacent to the infrared sensor of the electronic device; and modification means operatively connected to said transducer for modifying a characteristic of an audio signal applied to said audio reproduction system, said sensor being operatively connected to said modification means for changing said characteristic in accordance with instructions encoded in said infrared control signal.

22. The extension system defined in claim 21 wherein said characteristic is an amplitude of the audio signal applied to the speaker assembly.

23. A method for effecting control of an electronic device having an infrared sensor for receiving an infrared control signal from a manually actuated remote control, the method comprising:

operating the remote control to produce the infrared signal;

receiving said infrared signal at an audio speaker assembly of an audio reproduction system;

at the speaker assembly, generating an RF carrier frequency containing or carrying instructions encoded in the received infrared control signal;

transmitting the RF carrier frequency from the speaker assembly to the electronic device;

at the electronic device, receiving the RF carrier frequency;

in response to the received RF carrier frequency, generating, at said electronic device, a secondary infrared signal substantially similar to said infrared control signal;

emitting said secondary infrared signal toward the infrared sensor of the electronic device;

receiving an audio signal at said speaker assembly;

converting said audio signal to an electrical signal;

applying said electrical signal to said speaker to generate an acoustic pressure wave; and modifying, in accordance with instructions encoded in said infrared control signal, a characteristic of said electrical signal applied to said speaker assembly.

24. The method defined in claim 23 wherein said characteristic is a loudness or volume level of a reproduced audio signal.

25. An infrared remote control extension system for effecting control of an electronic device having, an infrared sensor for receiving an infrared control signal from a manually actuated remote control, the assembly comprising:

an audio speaker assembly including an electro-acoustic transducer, said transducer being operatively coupled to an audio reproduction system;

an infrared sensor at least indirectly attached to said speaker assembly for receiving and converting the infrared control signal from the remote control to an electrical signal;

a signal generator operatively connected to said sensor for generating an RF carrier signal containing or carrying control information encoded in said infrared control signal and said electrical signal;

transmission means for transmitting the RF carrier signal from said signal generator to the electronic device, and a signal receiver at the electronic device for receiving and converting the RF carrier signal transmitted from said signal generator to a secondary infrared signal essentially identical to said infrared control signal, said signal receiver being disposed adjacent to the infrared sensor of the electronic device, said transmission means including an antenna operatively connected to said signal generator for wirelessly transmitting said RF carrier signal from said signal generator to said signal receiver.

*26. An infrared remote control extension system for effecting control of an electronic device from a manually actuated remote control, the assembly comprising:*

*an audio speaker assembly including an electro-acoustic transducer, said transducer being operatively coupled to an audio reproduction system;*

*an infrared sensor at least indirectly attached to said speaker assembly for receiving and converting an infrared control signal from the remote control to an electrical signal;*

*a signal generator operatively connected to said sensor for generating an RF carrier signal including control information encoded in said infrared control signal and said electrical signal; and*

*transmission means for transmitting the RF carrier signal from said signal generator to the electronic device.*

*27. The extension system defined in claim 26, further comprising a signal receiver at the electronic device for receiving the RF carrier signal transmitted from said signal generator.*

*28. A method for effecting control of an electronic device from a manually actuated remote control, the method comprising:*

*operating the remote control to produce an infrared signal;*

*receiving said infrared signal at an audio speaker assembly of an audio reproduction system;*

*at the speaker assembly, generating an RF carrier frequency;*

*also at the speaker assembly, modulating the RF carrier frequency with instructions encoded in the received infrared control signal; and*

*transmitting the RF carrier frequency from the speaker assembly to the electronic device.*

*29. An infrared remote control extension system for effecting control of an electronic device from a manually actuated remote control, the assembly comprising:*

*an audio speaker assembly including an electro-acoustic transducer, said transducer being operatively coupled to an audio reproduction system;*

*an infrared sensor at least indirectly attached to said speaker assembly for receiving and converting an infrared control signal from the remote control to an electrical signal;*

*a signal generator operatively connected to said sensor for generating an RF carrier signal including control information encoded in said infrared control signal and said electrical signal; and*

*transmission means for transmitting the RF carrier signal from said signal generator to the electronic device.*

*30. The extension system defined in claim 29, further comprising:*

*a signal receiver at the electronic device for receiving the RF carrier signal transmitted from said signal generator; and*

*modification means operatively connected to said transducer for modifying a characteristic of an audio signal applied to said audio reproduction system, said sensor being operatively connected to said modification means for changing said characteristic in accordance with instructions encoded in said infrared control signal.*

*31. A method for effecting control of an electronic device from a manually actuated remote control, the method comprising:*

*operating the remote control to produce an infrared signal;*

*receiving said infrared signal at an audio speaker assembly of an audio reproduction system;*

*at the speaker assembly, generating an RF carrier frequency including instructions encoded in the received infrared control signal;*

*transmitting the RF carrier frequency from the speaker assembly to the electronic device;*

*receiving an audio signal at said speaker assembly;*

*converting said audio signal to an electrical signal;*

*applying said electrical signal to said speaker to generate an acoustic pressure wave; and*

*modifying, in accordance with instructions encoded in said infrared control signal, a characteristic of said electrical signal applied to said speaker assembly.*

*32. An infrared remote control extension system for effecting control of an electronic device from a manually actuated remote control, the assembly comprising:* an audio speaker assembly including an electro-*acoustic transducer, said transducer being operatively coupled to an audio reproduction system;*

*an infrared sensor at least indirectly attached to said speaker assembly for receiving and converting the infrared control signal from the remote control to an electrical signal;*

*a signal generator operatively connected to said sensor for generating an RF carrier signal including control information encoded in said infrared control signal and said electrical signal; and*

*transmission means for transmitting the RF carrier signal from said signal generator to the electronic device.*

*33. The extension system defined in claim 32, further comprising a signal receiver at the electronic device for receiving the RF carrier signal transmitted from said signal generator, said transmission means including an antenna operatively connected to said signal generator for wirelessly transmitting said RF carrier signal from said signal generator to said signal receiver.*

* * * * *